(12) United States Patent
Wakefield et al.

(10) Patent No.: US 8,528,923 B2
(45) Date of Patent: Sep. 10, 2013

(54) AXLE SUSPENSION SYSTEM

(75) Inventors: William Wakefield, Waterford, MI (US); Michael Andrew Power, Troy, MI (US); Michael David Lynch, Attica, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 0 days.

(21) Appl. No.: 13/327,910

(22) Filed: Dec. 16, 2011

(65) Prior Publication Data
US 2013/0154224 A1 Jun. 20, 2013

(51) Int. Cl.
*B60G 9/02* (2006.01)
(52) U.S. Cl.
USPC .............................. 280/124.116; 280/124.11
(58) Field of Classification Search
USPC ........ 280/124.116, 124.11, 124.153, 124.128
See application file for complete search history.

(56) References Cited

U.S. PATENT DOCUMENTS

| | | | |
|---|---|---|---|
| 4,693,486 A | 9/1987 | Pierce et al. | |
| 4,995,636 A | 2/1991 | Hall et al. | |
| 5,112,078 A | 5/1992 | Galazin et al. | |
| 5,366,237 A * | 11/1994 | Dilling et al. | 280/124.116 |
| 5,375,871 A | 12/1994 | Mitchell et al. | |
| 5,690,353 A | 11/1997 | Vandenberg | |
| 6,241,266 B1 * | 6/2001 | Smith et al. | 280/124.116 |
| 6,491,314 B2 * | 12/2002 | Smith et al. | 280/124.116 |
| 6,508,393 B2 | 1/2003 | Chalin | |
| 6,508,482 B2 * | 1/2003 | Pierce et al. | 280/124.116 |
| 6,557,875 B2 | 5/2003 | Schlosser et al. | |
| 6,672,604 B2 * | 1/2004 | Eveley | 280/124.128 |
| 6,827,360 B2 * | 12/2004 | Chan et al. | 280/124.116 |
| 6,843,490 B2 | 1/2005 | Raidel, II et al. | |
| 7,048,288 B2 | 5/2006 | Chan et al. | |
| 7,077,411 B2 | 7/2006 | Peters et al. | |
| 7,360,774 B2 * | 4/2008 | Saieg et al. | 280/124.128 |
| 7,484,744 B2 * | 2/2009 | Galazin et al. | 280/124.116 |
| 7,607,670 B2 | 10/2009 | Raidel, II et al. | |
| 7,669,866 B2 * | 3/2010 | Peaker et al. | 280/124.128 |
| 7,717,442 B2 * | 5/2010 | Chalin | 280/124.116 |
| 7,726,673 B2 * | 6/2010 | Saieg et al. | 280/124.128 |
| 7,731,211 B2 * | 6/2010 | Ramsey | 280/124.131 |
| 7,740,255 B2 * | 6/2010 | Holt | 280/124.128 |
| 8,002,297 B2 * | 8/2011 | Keiserman | 280/124.116 |
| 8,006,987 B2 * | 8/2011 | Saieg et al. | 280/124.116 |
| 8,029,008 B2 * | 10/2011 | Cortez et al. | 280/124.175 |
| 8,333,396 B2 * | 12/2012 | Saieg et al. | 280/124.128 |

* cited by examiner

*Primary Examiner* — Paul N Dickson
*Assistant Examiner* — Nicole Verley
(74) *Attorney, Agent, or Firm* — Brooks Kushman P.C.

(57) ABSTRACT

An axle suspension system for a vehicle. The axle suspension system may include an axle having an exterior surface and an axle wrap. The axle wrap may include a wrap portion, a cam bracket, and an actuator bracket. The wrap portion may engage the exterior surface. The cam bracket and actuator bracket may be spaced apart and may extend from the wrap portion.

20 Claims, 3 Drawing Sheets

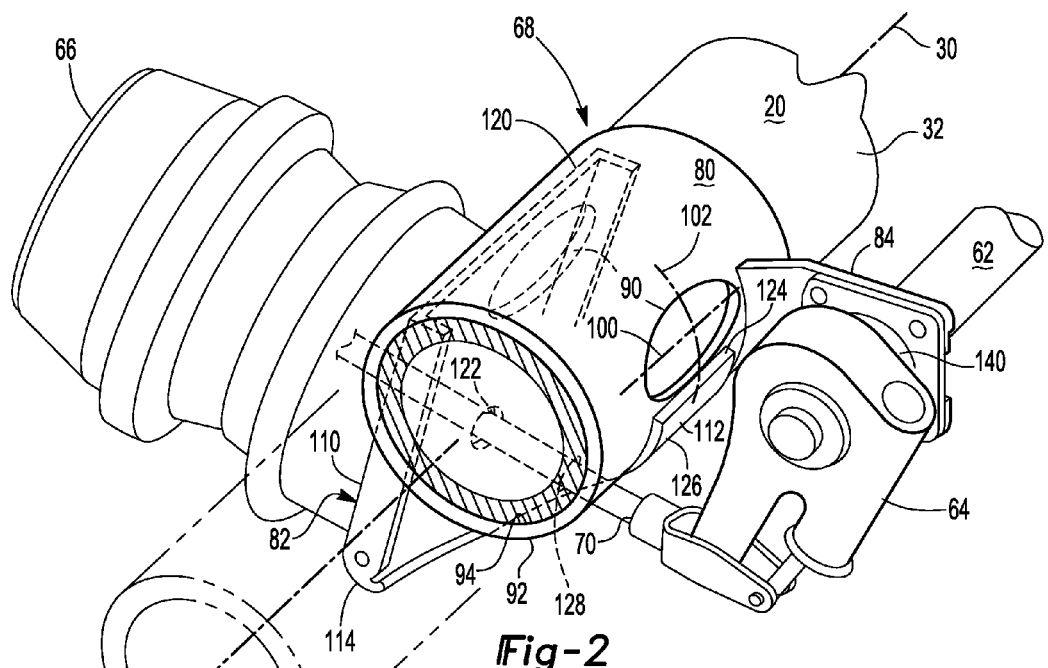
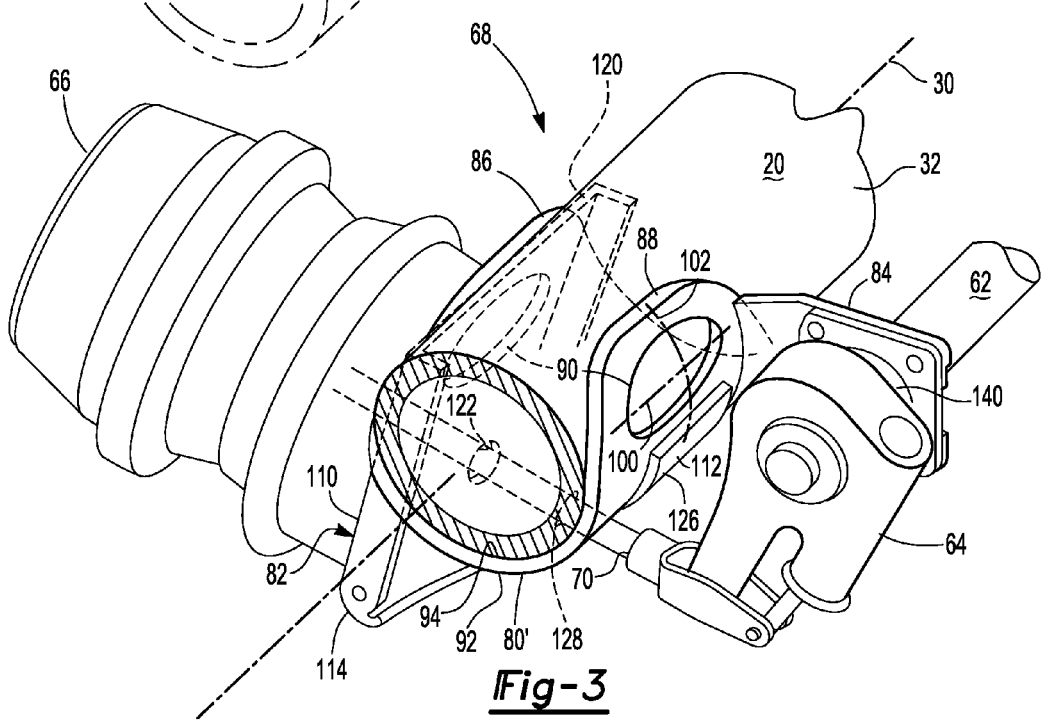

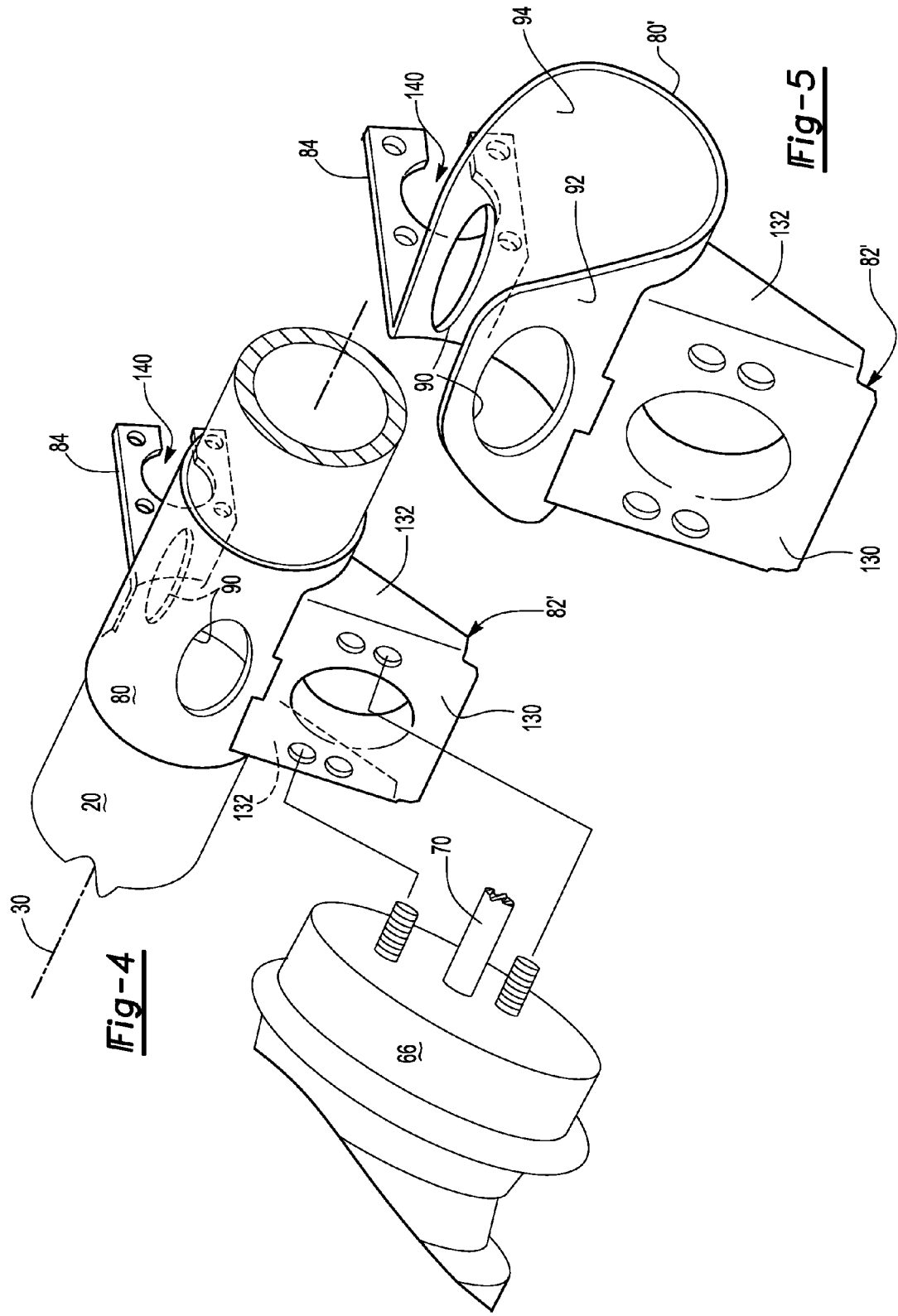

AXLE SUSPENSION SYSTEM

TECHNICAL FIELD

The present application relates to an axle suspension system that may be provided with a vehicle.

BACKGROUND

A trailing arm suspension with a wrapper compression axle mounting is disclosed in U.S. Pat. No. 6,241,266.

SUMMARY

In at least one embodiment, an axle suspension system is provided. The axle suspension system may include an axle having an exterior surface and an axle wrap. The axle wrap may include a wrap portion, a cam bracket, and an actuator bracket. The wrap portion may engage the exterior surface and may have a set of weld windows. Each member of the set of weld windows may extend through and may be completely defined within the wrap portion. The actuator bracket may be disposed on the wrap portion adjacent to a first member of the set of weld windows. The cam bracket may be disposed on the wrap portion adjacent to a second member of the set of weld windows and may extend away from the axle.

In at least one embodiment, an axle suspension system is provided. The axle suspension system may include an axle, a trailing suspension arm, and an axle wrap. The axle may have an exterior circumference surface. The trailing suspension arm may be disposed proximate the axle. The axle wrap may be spaced apart from the trailing suspension arm. The axle wrap may include a wrap portion, a cam bracket, and an actuator bracket. The wrap portion may engage the exterior circumference surface. The cam bracket may be provided for receiving a cam shaft that actuates a brake subsystem. The cam bracket may extend away from the exterior circumference surface. The actuator bracket may be provided for receiving an actuator that actuates the cam shaft. The actuator bracket may be disposed on the wrap portion and may be spaced apart from the cam bracket. The wrap portion may extend around more than half of the exterior circumference surface of the axle.

BRIEF DESCRIPTION OF THE DRAWINGS

FIG. 2 is a perspective view of a portion of the axle suspension system of FIG. 1.

FIG. 3 is a perspective view of a portion of an axle suspension system having a second embodiment of an axle wrap.

FIG. 4 is a perspective view of a portion of an axle suspension system having a third embodiment of an axle wrap.

FIG. 5 is a perspective view of a portion of an axle suspension system having a fourth embodiment of an axle wrap.

DETAILED DESCRIPTION

Figure 1:
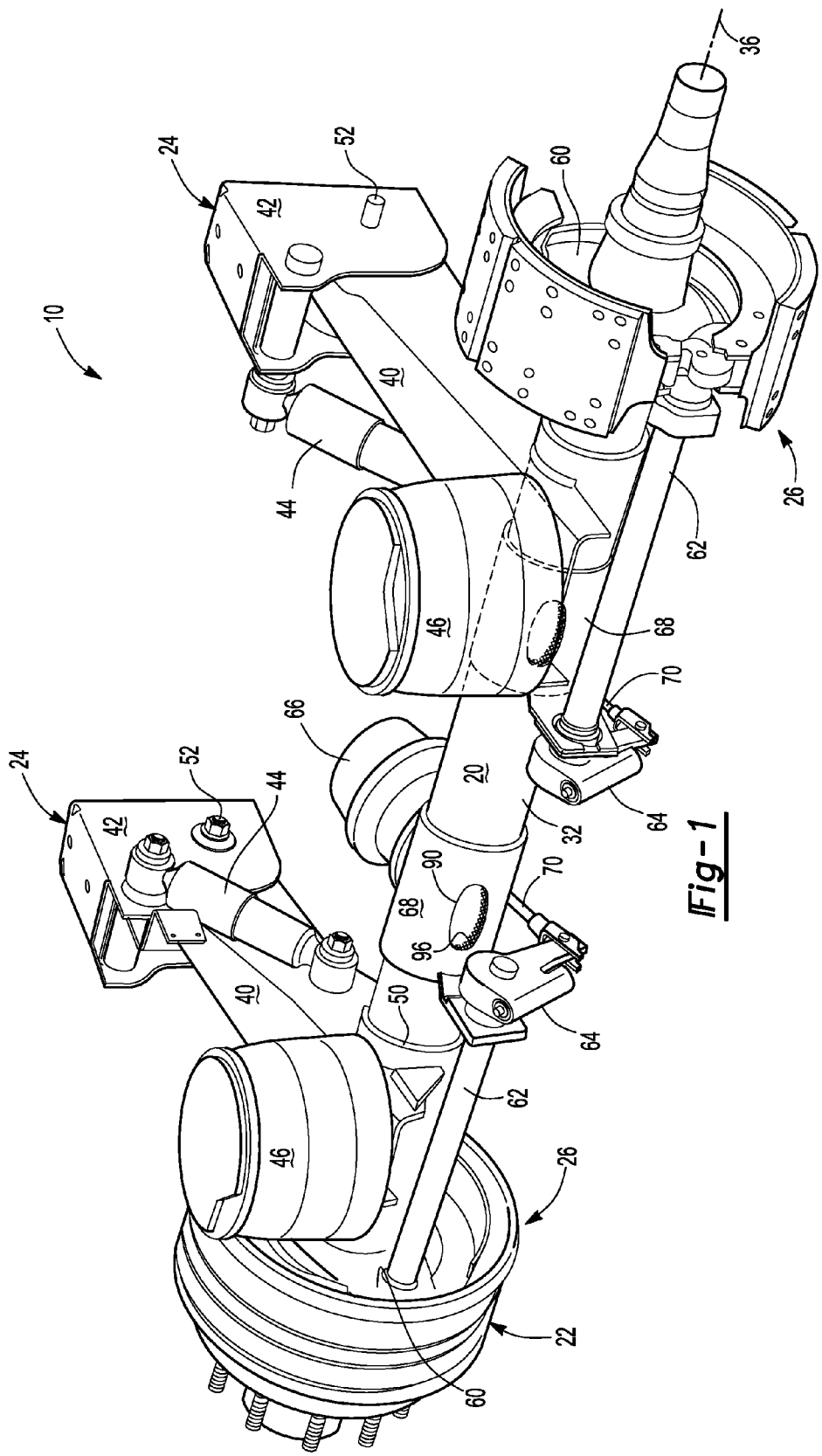
FIG. 1 is a perspective view of an exemplary axle suspension system having a first embodiment of an axle wrap.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Referring to FIG. 1, an exemplary axle suspension system 10 is shown. The axle suspension system 10 may be provided with a vehicle, such as a truck trailer. The axle suspension system 10 may include an axle 20, at least one wheel hub assembly 22, at least one trailing suspension arm assembly 24, and a brake subsystem 26.

The axle 20 may extend along an axis 30 and may have an exterior surface 32. The exterior surface 32 may be an exterior circumference of the axle 20.

One or more wheel hub assemblies 22 may be rotatably disposed on the axle 20. In the embodiment shown, a wheel hub assembly 22 is provided at each end of the axle 20. Each wheel hub assembly 22 may be configured to receive a wheel upon which a tire is mounted. In FIG. 1, the wheel hub assembly 22 located at the right end of the axle is shown with a wheel removed to move clearly show a portion of the brake subsystem 26.

One or more trailing suspension arm assemblies 24, which may also called trailing arms, may be mounted on the axle 20. In the embodiment shown, a pair of trailing suspension arm assemblies 24 is provided. The trailing suspension arm assembly 24 may include a trailing suspension arm 40, a hanger 42, a shock absorber 44, and an air spring 46.

The trailing suspension arm 40 may be fixedly coupled to the axle 20. In at least one embodiment, a suspension arm axle wrap 50 may be disposed around the axle 20 and positioned between the trailing suspension arm 40 and the axle 20 to facilitate mounting of the trailing suspension arm 40 to the axle 20.

The hanger 42 may be pivotally disposed at an end of the trailing suspension arm 40. The hanger 42 may be configured to be mounted to a support frame or chassis of the vehicle. The hanger 42 may receive a pivot pin 52 that may extend through the hanger 42 and the trailing suspension arm 40. As such, the trailing suspension arm 40 may pivot about the pivot pin 52 and pivot with respect to the hanger 42.

The shock absorber 44 may be provided to dampen shock impulses and dissipate kinetic energy. The shock absorber 44 may be mounted to the hanger 42 at a first end and to the trailing suspension arm 40 at a second end.

An air spring 46 may be disposed proximate an end of the trailing suspension arm 40 that is disposed opposite the hanger 42. The air spring 46 may be mounted to the support frame or chassis of the vehicle 10. The air spring 46 may receive compressed air and may be provided to absorb shocks and vibrations to improve ride quality. In addition, the air spring 46 may provide self-leveling functionality.

The brake subsystem 26 may be provided to brake or inhibit rotation of an associated wheel hub assembly 22. The brake subsystem 26 may be fixedly disposed on the axle 20 and may be spaced apart from the trailing suspension arm assembly 24. In at least one embodiment, the brake subsystem 26 may be configured with a drum brake assembly that may be coupled to a brake spider 60 that is configured to actuate a brake pad. In addition, the brake subsystem 26 may include a brake actuation unit that includes a cam shaft 62, a slack adjuster 64, an actuator 66, and an axle wrap 68.

The cam shaft 62 may extend from the brake spider 60. The cam shaft 62 may be rotatably supported by an axle wrap 68 as will be described in more detail below. In at least one embodiment, the cam shaft 62 may extend substantially parallel to the axis 30 of the axle 20.

The slack adjuster 64 may be provided to compensate for brake wear. The slack adjuster 64 may be fixedly disposed near an end of the cam shaft 62. For example, the slack adjuster 64 may have a center bore that receives the cam shaft 62. The center bore of the slack adjuster 64 and the cam shaft 62 may have mating splines that couple the slack adjuster 64 and a cam shaft 62 together.

The actuator 66 may be provided to actuate the cam shaft 62. The actuator 66 may be fixedly mounted to the axle wrap 68 as will be described in more detail below. The actuator 66 may be of any suitable type, such as a pneumatic actuator. The actuator 66 may include an actuator shaft 70 that extends to the slack adjuster 64. The actuator 66 may move between a retracted position and an extended position. In the retracted position, the cam shaft 62 may be positioned such that the brake subsystem 26 does not inhibit rotation of an associated wheel hub assembly 22. In the extended position, the cam shaft 62 may be rotated such that the brake subsystem 26 inhibits rotation of an associated wheel hub assembly 22. In FIG. 1, one actuator 66 is hidden behind an air spring 46 and is not shown for clarity.

Referring to FIGS. 1-3, the axle wrap 68 may be disposed on the axle 20 and may facilitate mounting of the cam shaft 62 and the actuator 66. The axle wrap 68 may be spaced apart from the trailing suspension arm assembly 24 in one or more embodiments. The axle wrap 68 may include a wrap portion 80, an actuator bracket 82, and a cam bracket 84.

The wrap portion 80 may engage and extend at least partially around the exterior surface 32 or circumference of the axle 20. In the embodiment shown in FIG. 2, the wrap portion 80 extends completely around the circumference of the axle 20. In the embodiment shown in FIG. 3, the wrap portion 80' extends partially around the axle 20 and includes a first end surface 86 that is spaced apart from a second end surface 88 that is disposed opposite the first end surface 86. The first and second end surfaces 86, 88 may be disposed above the axis 30 in one or more embodiments. As such, the wrap portion 80' may extend more than halfway or more than 180° around the circumference of the axle 20.

The wrap portion 80, 80' may include a set of weld windows 90. The set may include one or more members and each member of the set of weld windows 90 may be configured as a hole that extends from a first surface 92 of the wrap portion 80, 80' to a second surface 94. The second surface 94 may be disposed opposite the first surface 92 and may engage the exterior surface 32 of the axle 20. Each weld window 90 may be completely defined by or bounded within the wrap portion 80, 80'. In addition, each weld window 90 may be configured to receive a weld 96, best shown in FIG. 1, that extends completely around a weld window 90. In the embodiment shown, first and second weld windows 90 are provided. The first weld window 90 may be disposed adjacent to the actuator bracket 82. The second weld window 90 may be disposed adjacent to the cam bracket 84. The first and second weld windows 90 may be disposed directly opposite each other in one or more embodiments.

Each weld window 90 may have an oval configuration that includes a major axis of symmetry 100 and a minor axis of symmetry 102. The major axis 100 may be longer than the minor axis 102 and may extend substantially parallel to the axis 30 of the axle 20. The minor axis 102 may extend perpendicular to the major axis 100 and may extend along or substantially parallel to the exterior surface 32 or circumference of the axle 20. As such, the weld 96 may be configured as an oval shaped ring with a weld-free center. Weld windows may also be omitted in one or more embodiments. In such embodiments, friction may fixedly position the wrap portion 80 on the axle 20.

The actuator bracket 82 may facilitate mounting of the actuator 66. The actuator bracket 82 may be disposed on the first surface 92 of the wrap portion 80, 80'. The actuator bracket 82 may be provided in various embodiments. In FIGS. 2 and 3, the actuator bracket 82 has a one-piece configuration that includes a first wall 110, a second wall 112, and a bend 114.

The first wall 110 may have a first end 120 and may extend to the bend 114. The actuator 66 may be mounted to a first wall 110 in any suitable manner. For example, the first wall 110 may include one or more mounting holes that receive a fastener or a portion of the actuator 66 to position the actuator 66 with respect to the actuator bracket 82. In addition, the first wall 110 may include a first actuator shaft hole 122. The first end 120 may engage and may be fixedly attached to the wrap portion 80, 80'. In addition, the first end 120 may be disposed adjacent to and below the first weld window 90, if provided.

The second wall 112 may have a second end 124 and may extend to the bend 114. As such, the second wall 112 may extend at an angle with respect to the first wall 110. The second wall 112 may include a curved portion 126 that extends from the second end 124 toward the bend 114. The curved portion 126 may continuously engage and may be fixedly attached to the wrap portion 80, 80'. The second wall 112 may define a second actuator shaft hole 128. The actuator shaft 70 may extend through the first and second actuator shaft holes 122, 128 to the slack adjuster 64.

In the embodiments shown in FIGS. 3 and 4, the actuator bracket 82' includes a first wall 130, and a pair of side walls 132. The first wall 130 may engage and may be fixedly attached to the wrap portion 80, 80' at a first end. The side walls 132 may extend from opposing edges of the first wall 130 away from the actuator 66. Edges of each side wall 132 that are disposed adjacent to the wrap portion 80 may be welded to the wrap portion 80 in one or more embodiments.

The cam bracket 84 may facilitate mounting of the cam shaft 62. For example, the cam bracket 84 may include an opening 140 through which the cam shaft 62 extends. The opening 140 may facilitate rotation of the cam shaft 62. The cam bracket 84 may be provided in various embodiments. For example, the cam bracket 84 may be integrally formed with the wrap portion 80, or provided as a unitary one piece component. Alternatively, the cam bracket 84 may be provided as a separate component that is welded to the wrap portion 80. The cam bracket 84 may be disposed at an end surface or edge of the wrap portion 80 and may extend substantially perpendicular to the axis 30 or radially away from the axis 30. As such, the cam bracket 84 may be spaced apart from the axle 20 and the actuator bracket 82, 82'. The cam bracket 84 may also be disposed adjacent to the second weld window 90 if provided. Moreover, the cam bracket 84 may be provided along an edge of the wrap portion 80 that is disposed closest to the trailing suspension arm 40 in one or more embodiments.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An axle suspension system comprising:
  an axle having an exterior surface; and
  an axle wrap including:
    a wrap portion that engages the exterior surface, the wrap portion having a set of weld windows, wherein each member of the set extends through and is completely defined within the wrap portion;

a cam bracket for receiving a cam shaft, wherein the cam bracket is disposed on the wrap portion adjacent to a second member of the set of weld windows and extends away from the axle; and an actuator bracket for receiving an actuator that actuates the cam shaft, wherein the actuator bracket is disposed on the wrap portion adjacent to a first member of the set of weld windows such that the first member of the set of weld windows is disposed above the actuator bracket.

2. The axle suspension system of claim 1 further comprising a trailing suspension arm mounted to the axle, wherein the axle wrap is spaced apart from the trailing suspension arm.

3. The axle suspension system of claim 1 wherein the exterior surface is a circumference of the axle and the axle wrap extends completely around the circumference.

4. The axle suspension system of claim 1 wherein the exterior surface is a circumference of the axle and the wrap portion extends partially around the circumference such that the axle wrap has a first end surface and a second end surface that are spaced apart and disposed opposite each other.

5. The axle suspension system of claim 1 wherein the cam bracket is spaced apart from the axle and the actuator bracket.

6. The axle suspension system of claim 1 wherein the wrap portion and cam bracket are provided as a single unitary component, wherein the cam bracket extends from an end of the wrap portion.

7. The axle suspension system of claim 1 wherein the axle is disposed along an axis and the cam bracket extends substantially perpendicular to the axis.

8. The axle suspension system of claim 1 wherein the first and second weld windows are spaced apart from each other and disposed directly opposite each other on opposite sides of the axle.

9. The axle suspension system of claim 8 wherein each member of the set of weld windows has an oval configuration with a major axis of symmetry that extends substantially parallel to an axis along which the axle is disposed and a minor axis of symmetry that extends along the exterior surface of the axle.

10. An axle suspension system comprising:
an axle having an exterior circumference surface;
first and second trailing suspension arms disposed proximate the axle; and
an axle wrap spaced apart from and completely disposed between the first and second trailing suspension arms, the axle wrap including:
a wrap portion that engages the exterior circumference surface;
a cam bracket for receiving a cam shaft that actuates a brake subsystem, the cam bracket extending away from the exterior circumference surface; and
an actuator bracket for receiving an actuator that actuates the cam shaft, wherein the actuator bracket is disposed on the wrap portion and spaced apart from the cam bracket;
wherein the wrap portion extends around more than half of the exterior circumferential surface.

11. The axle suspension system of claim 10 wherein the actuator bracket has a first end, a second end disposed opposite the first end, and a bend, wherein the first end engages the wrap portion, the bend is disposed below the axle, and the second end engages the wrap portion adjacent to the cam bracket.

12. The axle suspension system of claim 11 further comprising a first weld window disposed completely in the axle wrap, wherein the first weld window is disposed adjacent to and above the first end of the actuator bracket.

13. The axle suspension system of claim 12 further comprising a second weld window, wherein the second weld window is disposed adjacent to and above the second end of the actuator bracket.

14. The axle suspension system of claim 13 further comprising first and second welds that extends completely around the first and second weld windows for fixing the axle wrap to the axle.

15. The axle suspension system of claim 11 wherein the actuator bracket includes a first wall disposed between the first end and the bend and a second wall disposed between the bend and the second end, wherein the second wall has a hole.

16. The axle suspension system of claim 15 further comprising:
an actuator having an actuator shaft;
a cam shaft received in the cam bracket; and
a slack adjuster disposed on the cam shaft;
wherein the actuator shaft extends through the hole to engage the slack adjuster.

17. The axle suspension system of claim 15 wherein the second wall has a curved portion that extends from the second end, wherein the curved portion continuously engages an exterior surface of the wrap portion.

18. The axle suspension system of claim 10 wherein the actuator bracket and the cam bracket are spaced apart from the axle.

19. The axle suspension system of claim 10 wherein the axle wrap is fixedly disposed on the axle free of a weld.

20. An axle suspension system comprising:
an axle having an exterior circumference surface;
a trailing suspension arm disposed proximate the axle; and
an axle wrap spaced apart from the trailing suspension arm, the axle wrap including:
a wrap portion that engages the exterior circumference surface;
a cam bracket for receiving a cam shaft that actuates a brake subsystem, the cam bracket extending away from the exterior circumference surface; and
an actuator bracket for receiving an actuator that actuates the cam shaft, wherein the actuator bracket is disposed on the wrap portion and spaced apart from the cam bracket and has a first end, a second end disposed opposite the first end, and a bend, wherein the first end engages the wrap portion, the bend is disposed below the axle, and the second end engages the wrap portion adjacent to the cam bracket; and
a first weld window disposed completely in the axle wrap, wherein the first weld window is disposed adjacent to and above the first end of the actuator bracket;
wherein the wrap portion extends around more than half of the exterior circumferential surface.

* * * * *

UNITED STATES PATENT AND TRADEMARK OFFICE
CERTIFICATE OF CORRECTION

PATENT NO. : 8,528,923 B2
APPLICATION NO. : 13/327910
DATED : September 10, 2013
INVENTOR(S) : William Wakefield et al.

Page 1 of 1

It is certified that error appears in the above-identified patent and that said Letters Patent is hereby corrected as shown below:

In the Claims

Claim 14, Column 6, line 14, after "first and second welds that", delete "extends" and insert --extend--.

Signed and Sealed this
Thirty-first Day of December, 2013

Margaret A. Focarino
*Commissioner for Patents of the United States Patent and Trademark Office*